United States Patent [19]
Clauer

[11] Patent Number: 5,988,982
[45] Date of Patent: Nov. 23, 1999

[54] ALTERING VIBRATION FREQUENCIES OF WORKPIECES, SUCH AS GAS TURBINE ENGINE BLADES

[75] Inventor: Allan H. Clauer, Worthington, Ohio

[73] Assignee: LSP Technologies, Inc., Dublin, Ohio

[21] Appl. No.: 08/926,622

[22] Filed: Sep. 9, 1997

[51] Int. Cl.[6] .......................... B64C 11/20; B23K 26/00
[52] U.S. Cl. .................................. 416/241 R; 416/223 A; 416/500; 416/140; 219/121.62; 219/121.78; 219/121.79; 219/121.8; 219/121.82
[58] Field of Search .............................. 416/140, 241 R, 416/223 A, 500; 219/121.62, 121.78, 121.79, 121.8, 121.82

[56] References Cited

U.S. PATENT DOCUMENTS

| | | |
|---|---|---|
| 4,118,147 | 10/1978 | Ellis ........................................ 416/230 |
| 4,426,867 | 1/1984 | Neal et al. .................................. 72/53 |
| 4,878,810 | 11/1989 | Evans ....................................... 416/203 |
| 5,131,957 | 7/1992 | Epstein et al. .......................... 148/565 |
| 5,591,009 | 1/1997 | Mannava et al. ................... 416/241 R |
| 5,620,307 | 4/1997 | Mannava et al. ................... 416/241 R |

*Primary Examiner*—Christopher Verdier
*Assistant Examiner*—Matthew T. Shanley
*Attorney, Agent, or Firm*—Randall J. Knuth

[57] ABSTRACT

A method of modifying the vibration resonance characteristics of a workpiece includes the steps of determining a vibratory resonance condition frequency of the workpiece, determining the mode shape of said vibratory resonance condition, locating an area on the workpiece that includes a maximum curvature for the determined mode shape and vibratory resonance condition frequency; then laser shock peening the located area to create residual compressive stresses within the workpiece to shift the determined vibratory resonance condition frequency. A workpiece such as a gas turbine engine blade is also disclosed.

9 Claims, 8 Drawing Sheets

1ST FLEXURAL (1F)

1ST TORSION (1T)

2ND FLEXURAL (2F)

2ND TORSION (2T)

3RD FLEXURAL (3F)

3RD TORSION (3T)

1ST-2 STRIPE (1-2S)

1ST-3 STRIPE (1-3S)

ALTERING VIBRATION FREQUENCIES OF WORKPIECES, SUCH AS GAS TURBINE ENGINE BLADES

BACKGROUND OF THE INVENTION

1. Field of the Invention

The present invention relates to the use of coherent energy pulses, as from high powered pulse lasers, in shock processing of solid materials, and more particularly to methods and apparatus for changing the vibrational frequency and mode shapes of workpieces, such as gas turbine engine blades to improve blade lifetime, and the engine operating envelope.

2. Description of the Related Art

Airfoil failures, i.e., cracking, separation, and distortion, result from a number of different causes, one being vibratory resonance. Gas turbine engine blades occasionally respond in their operating envelope by resonant mode vibration between their start, idle and maximum RPM speeds.

As shown in FIG. 1, there are many possible, ideal fundamental vibration mode shapes that a turbine blade may undergo. Particular sources of low order excitation include inlet distortion, bleed ducts, and frame or vane struts. Such resonance modes may be plotted in relationship between blade frequency and rotor speed as shown in FIG. 2.

Elastic or aerodynamic coupling of blades within a compressor stage, may result in mode vibrations. Furthermore, other types of aerodynamic instability, such as flutter or the like, may create an unstable or self-feeding resonance within the blade.

At particular resonance conditions, these gas turbine engine blades may be subjected to very high amplitude beating, therefore, creating high fatigue stresses at the resonance nodes. In operation, such gas turbine engines are constructed to be operated away from such resonant frequencies of the blades. This, however, is difficult when confronted with many resonance modes in the blade.

Engine designers sometimes find that where they wish to operate a gas turbine engine (for greatest efficiency), a problem arises in that at such speed, resonance conditions occur for at least one set of engine blades.

What is needed in the art is the ability to shift or alter the resonance frequency of a gas turbine engine blade.

SUMMARY OF THE INVENTION

According to the present invention a structure and method for modifying the vibration characteristics of a workpiece, particularly a gas turbine engine blade, is taught. Laser shock peening is applied to locations on the workpiece, particularly to areas of high bending strains between or near the nodal lines for a particular preselected vibration mode. The use of laser shock peening is used to modify the airfoil or the workpiece natural vibration frequencies and mode shapes to improve their operating characteristics. The procedure may be utilized during design of the blade, as an after-design correction procedure, a correction procedure for vibration problems encountered during engine operation, or a method of modifying existing blades to minimize potential problems.

The invention, in one form thereof, comprises a gas turbine engine compressor blade formed from a metallic airfoil having a leading edge and a trailing edge, with at least one center surface between the leading edge and trailing edge. The airfoil has a plurality of natural vibration modes, each having a particular resonance frequency. The blade includes a means for changing the frequency of a preselected one of said plurality of vibration modes to prevent resonance at a particular frequency.

In another form of the invention, a method is utilized for modifying the vibration characteristics of the workpiece, the method includes the steps in determining a vibratory resonance condition frequency of the workpiece, determining the mode shape of the vibratory resonance condition, then locating an area on a workpiece that includes a curvature (preferably a maximum curvature) for the predetermined mode shape at the vibratory resonance condition frequency. The method utilizes laser shock peening the located area to create residual compressive stresses within the workpiece to change the predetermined natural vibratory resonance frequency. The method also includes alternate ways of introducing local residual compressive stresses, such as shot peening along a line.

An advantage of the present invention is that it reduces vibratory amplitudes that may damage the workpiece, such as gas turbine engine blades, at particular frequencies. Such change in vibration frequency and mode shape may improve workpiece or blade lifetime, and for blades, the engine operating envelope.

Another advantage of the present invention is, the use of laser shock peening can be utilized to modify the airfoil and vibration frequencies and mode shapes in the design stage to improve the operating characteristics of the blade and engine. Additionally, the method may be used for an after-manufacturing solution to vibration problems encountered during engine operations or modification of existing blades to minimize a potential problem.

A further advantage of the invention is that by moving the resonance frequency of the workpiece by a fraction, even as small a range as two to five percent, high amplitude beating at a particular initial resonance frequency is eliminated, thereby reducing high fatigue stresses at the node of that vibration mode.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Laser shock peening has been used in the past as an effective method of increasing fatigue life in metal by treating fatigue critical regions. In the prior history of laser shock processing and that of high powered processing of engineered materials, reference can be made to U.S. Pat. No. 5,131,957. This patent shows a type of laser and laser circuit adaptable for use of the present invention. Another type of laser adaptable for use of the invention, is that with a Nd-glass laser manufactured by LSP Technologies of Dublin, Ohio.

In accordance with the present invention, the use of opaque classic overlays is known with standard laser shock processing of laser peening processing. Such descriptions of transparent and opaque laser peening overlays used with the process are not discussed here.

The present invention includes utilization of laser shock processing to shift the vibratory resonance condition of a workpiece, such as a gas turbine engine airfoil.

Figure 1:
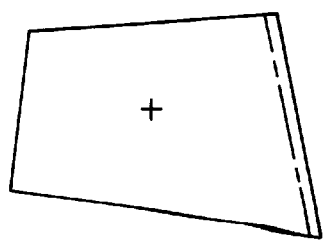
FIG. 1 is a collection of ideal resonance mode shapes for a workpiece, particularly a gas turbine engine airfoil.
Figure 1:
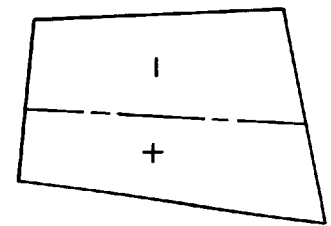
Figure 1:
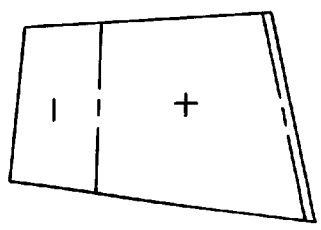
Figure 1:
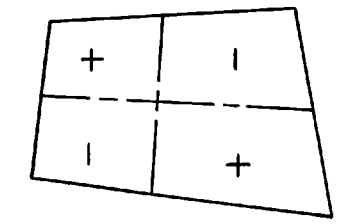
Figure 1:
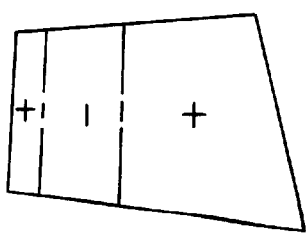
Figure 1:
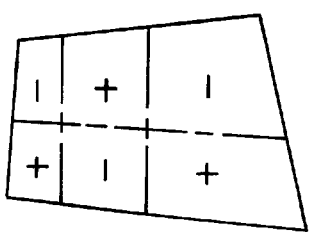
Figure 2:
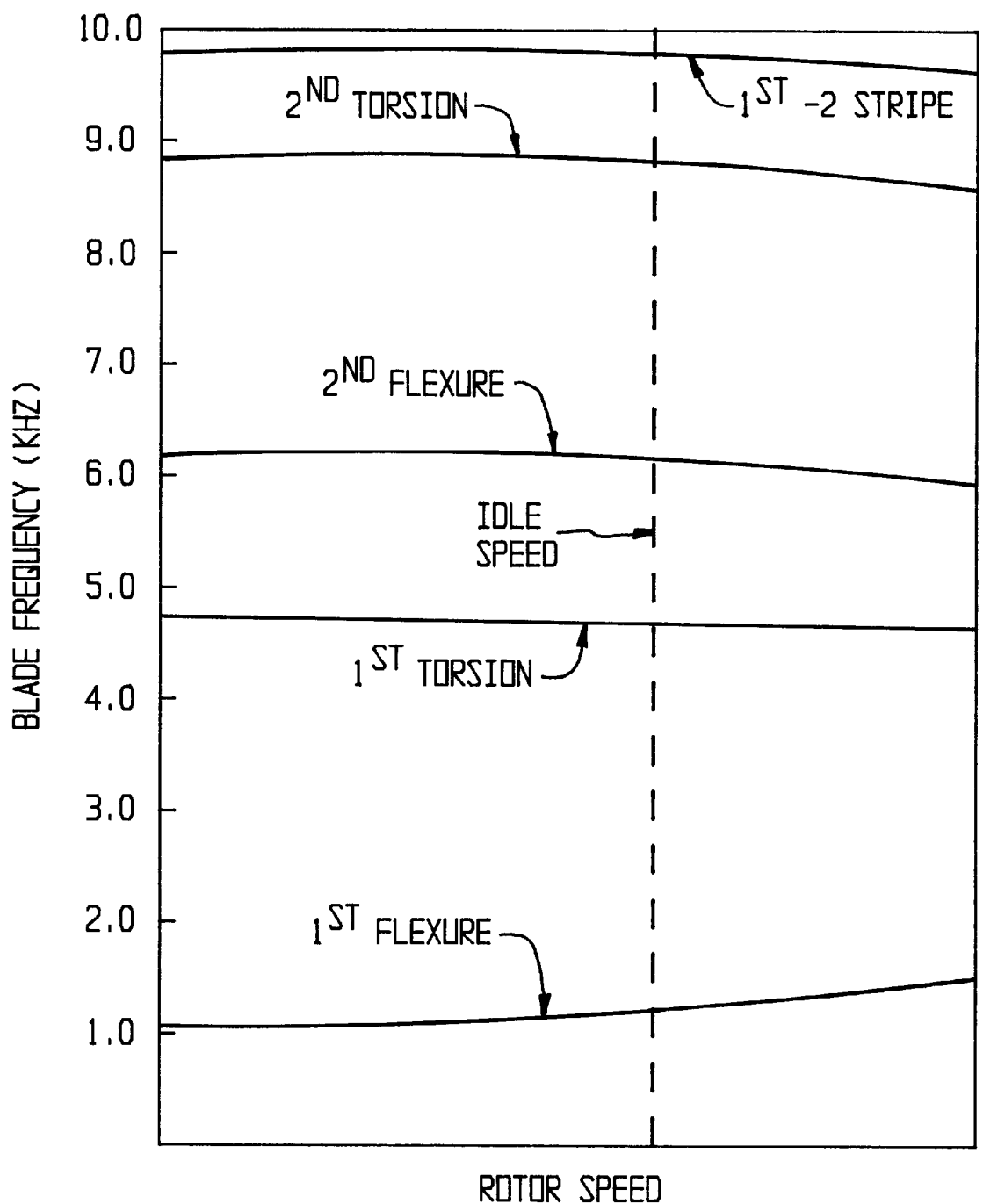
FIG. 2 is a representative graph showing blade resonance frequency compared to gas turbine engine rotor speed, showing particular example resonance modes.

FIG. 1, shows exemplary or ideal vibration modes for a workpiece, particularly a gas turbine engine airfoil. Such modes may be formed when the gas turbine engine, to which the airfoil attached, is operated at a particular rotor speeds, as shown in FIG. 2.

Laser shock peening is known to create deep residual compressive stress within the workpiece so peened. Prior to the invention, on investigation by the present inventor, no knowledge or teaching of affecting the natural vibrational frequency response in a workpiece has been shown by laser shock peening, or any other method of creating residual compressive stresses.

Operating stresses or externally applied stresses affect the natural frequencies of beams, shells, and airfoils. The trend is for many natural frequencies to increase under a tensile stress and to decrease under a compressive stress. For example, the natural vibration frequencies of airfoils rotating in gas turbine engines increase with increasing RPM. However, there is no known teaching where the intrinsic stresses within the workpieces change the natural frequency. Laser shock peening is able to introduce high compressive residual stresses within a large enough volume of the workpiece to enable the natural frequencies to be modified in a controlled way over a significant range for practical use. These changes in the natural frequencies are independent of the operating stresses, and enable the airfoil or workpiece to be "tuned".

Figure 3:
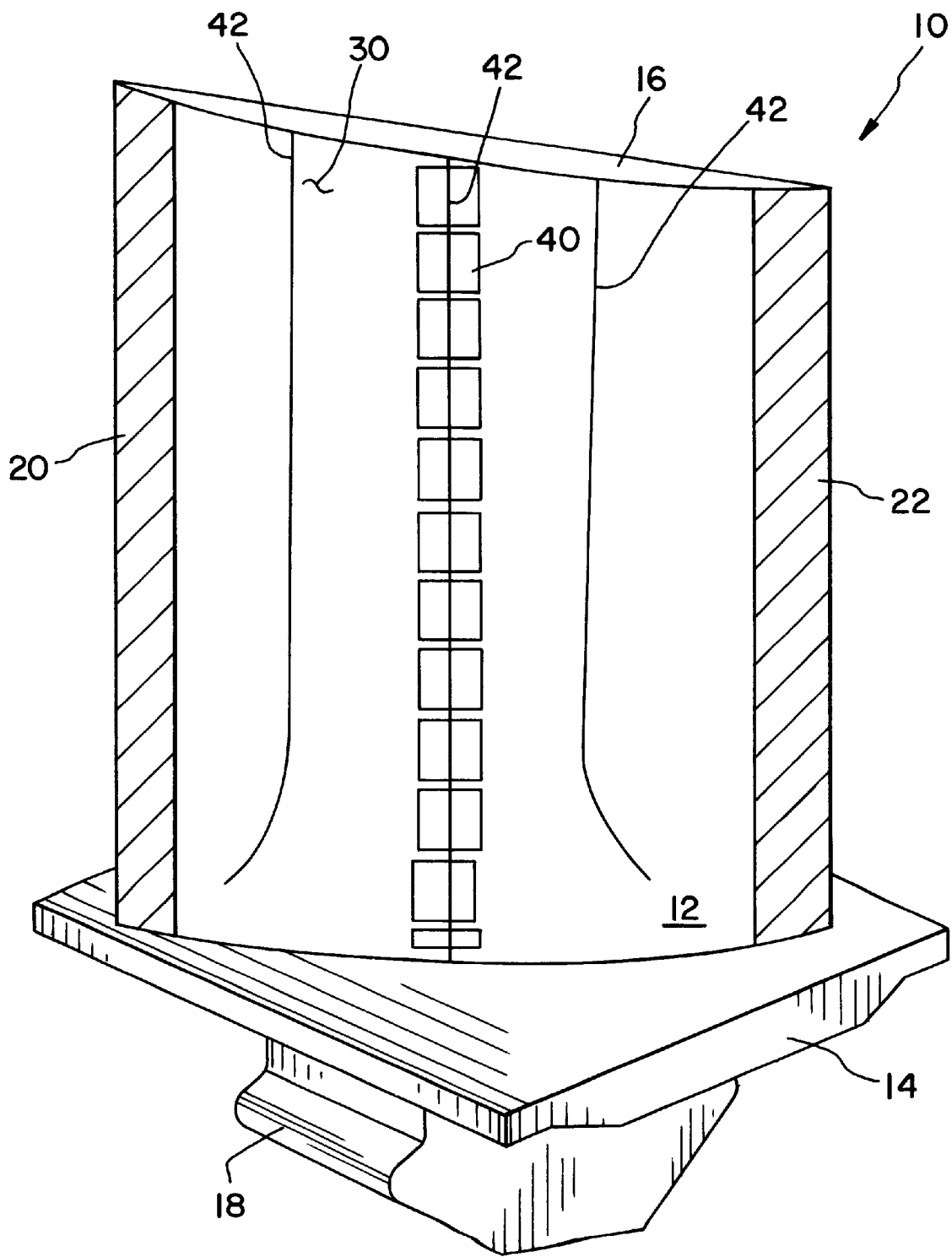
FIG. 3 is a perspective view of a workpiece, such as an aircraft gas turbine engine compressor blade of the present invention.

FIG. 3, shows the workpiece of the present invention, such as a gas turbine engine blade which includes an airfoil 12 extending radially outward from a blade platform 14 to a blade tip 16. Blade 10 includes a root section 18 extending radially inward from the platform to a radially inward end. Airfoil 12 extends in a chordwise direction between a leading edge 20 and a trailing edge 22. Airfoil 12 further includes center surface 30, which separates leading edge 20 and trailing edge 22.

A plurality of laser shock peened regions 40 are shown aligned between nodal lines 42, in this case a 1st–2nd stripe (FIG. 1) torsion mode where there may be maximum bending curvature. Alternatively, laser shock peened regions 40 may be applied to other locations either on or adjacent the different nodal lines of the blade, i.e., such nodal lines shown in FIG. 1 and others known in the art of airfoil design. It should be realized, that different workpieces, and particularly different styles of aircraft gas turbine blades may have different types of nodal characteristics, based upon their geometry and construction materials. Additionally, for improved changes or shifting of the vibratory conditions of resonance of a particular workpiece, it may be necessary to shock at different regions of the same blade, such locations to be determined through experimentation or models, when a problem arises with a particular workpiece during operation.

Figure 4:
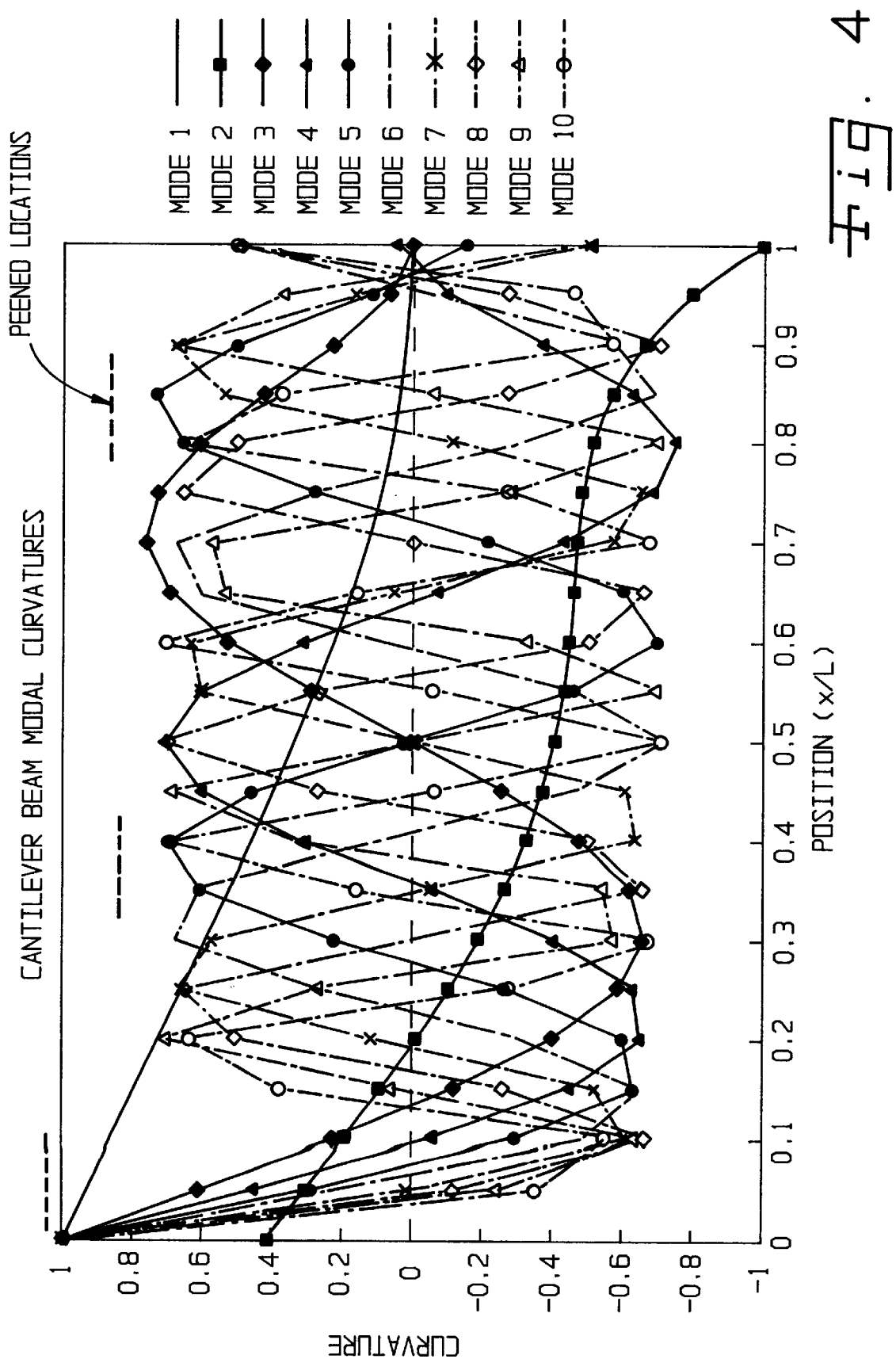
FIG. 4 is a graph of an antilever beam test workpiece vibratory response showing the plurality of vibratory modes.

An example of modifying the vibration damping characteristics, and moving the vibratory resonance condition frequency of a workpiece, has been conducted for test pieces of titanium, steel, and aluminum. Prior to operation of the inventional method, these test pieces, cantilever beams, were analyzed by vibrational analysis procedures. A curvature graph versus distance along the beam was developed for some mode numbers, as shown in FIG. 4, in which the curvature of particular locations, as compared to their modes and were determined.

Application of laser shock peened regions at positions between 0 and 10 percent of the length, and 35 to 45 percent (Distance from root to end of length) was conducted for the first laser peening. These areas were expanded between 0 and 20 percent, and 30 to 50 percent of the beam length for the second laser peening. Each spot was worked on opposite sides of the workpiece via split beam processing. Each spot location was peened three times in both the first and second round of peening.

Figure 5:
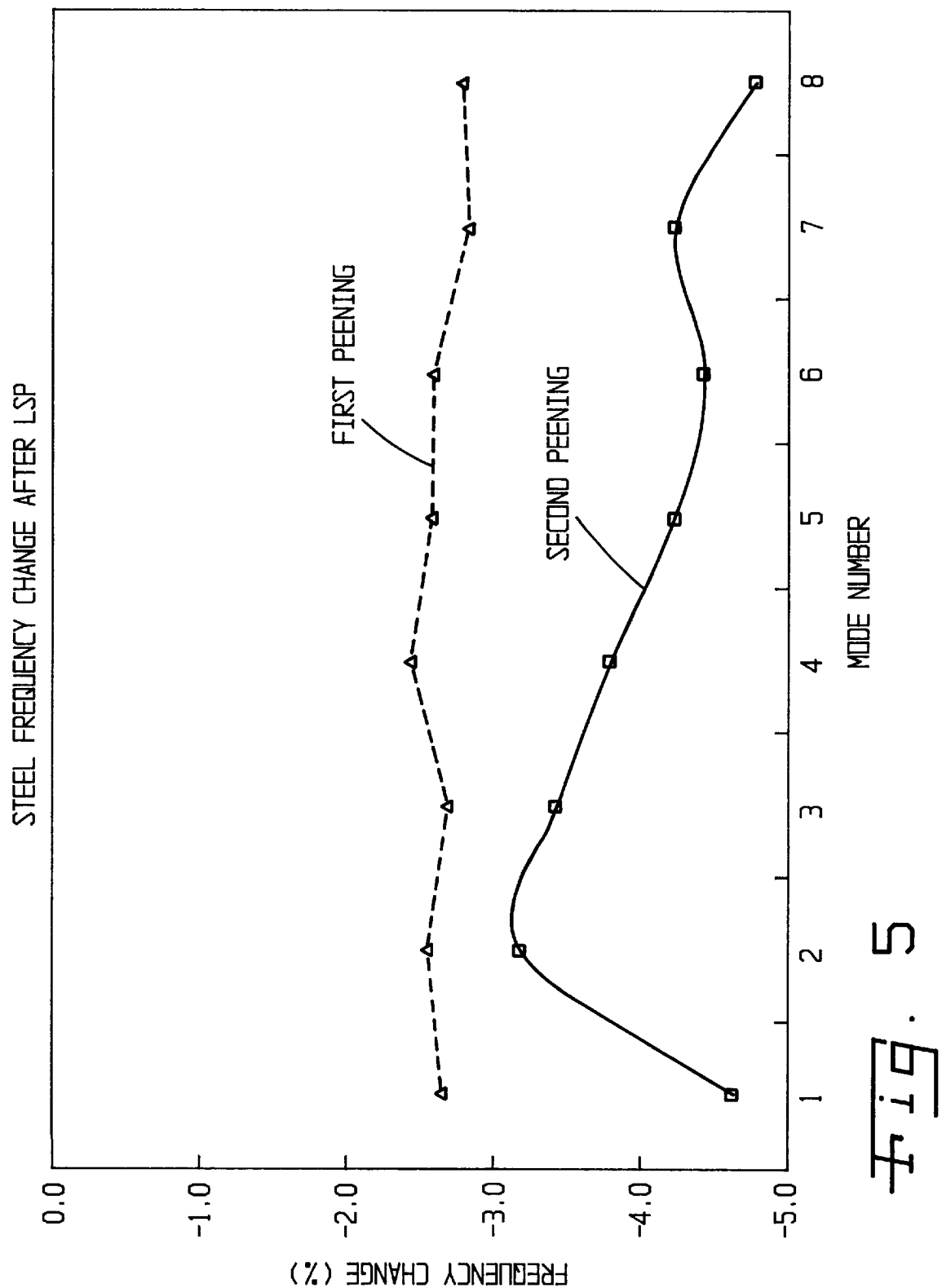
FIG. 5 is a graph of test results of the method of the present invention applied to a steel test piece.
Figure 6:
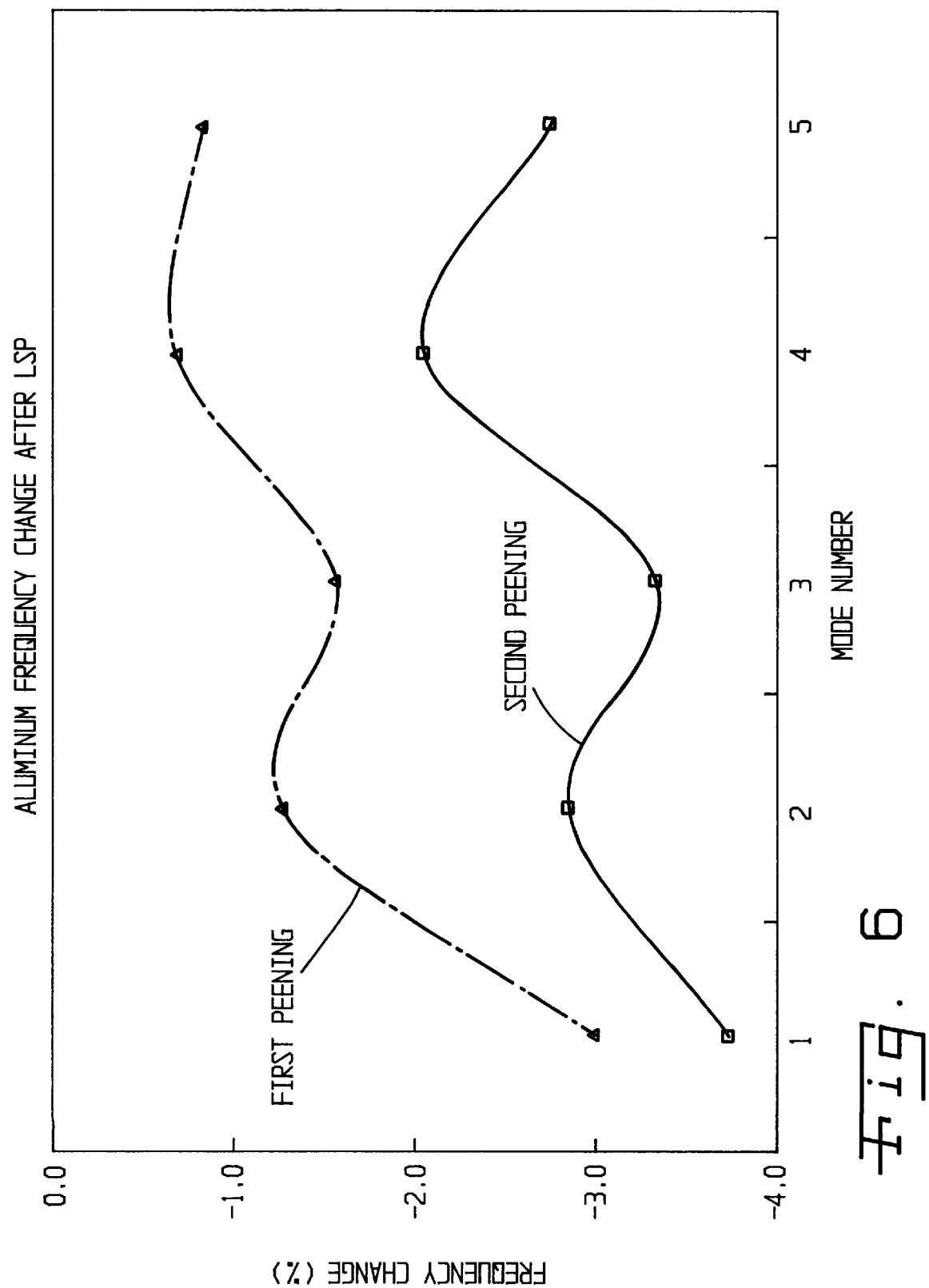
FIG. 6 is a graph of test results of the method of the present invention applied to an aluminum test piece.
Figure 7:
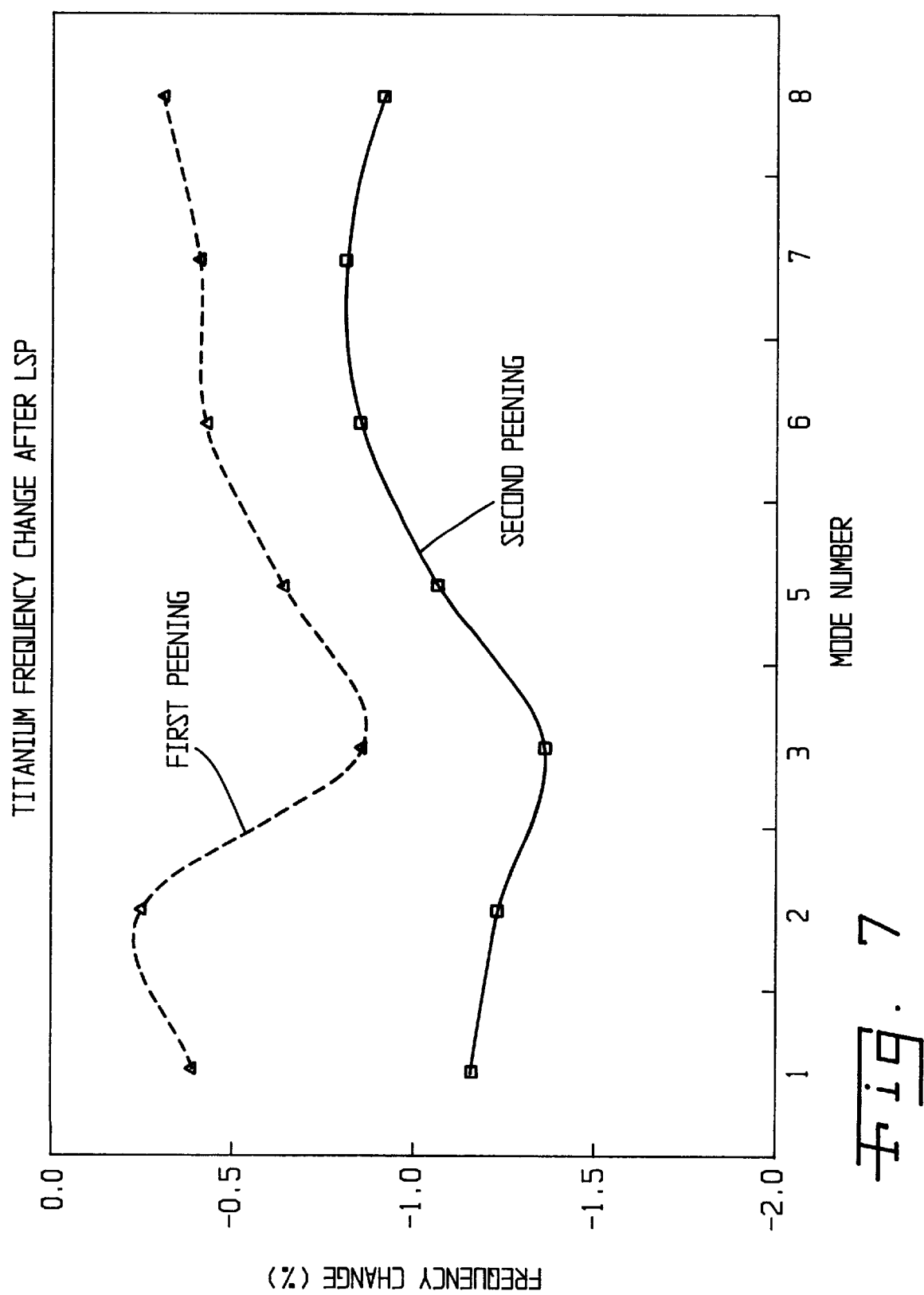
FIG. 7 is a graph of test results of the method of the present invention applied to a titanium test piece.

FIGS. 5, 6, and 7 show the altered vibrational frequency change as compared to the mode number in the first round of laser shock peening. After the first round of peening, data on the frequency response change on each of the different test pieces as compared to particular mode numbers was collected via vibration analysis.

After analysis, the same areas on the three test pieces were laser peened once more (i.e., the second round of peening), and a second graph of frequency response changes compared to mode numbers for each of the particular test pieces was created.

Each of the materials laser peened showed changes in frequency after each laser shock peening. The incremental changes were in the same direction and nominally the same for each treatment. This indicates that there changes were not simple scatter, but were actual, progressive, frequency changes caused by the residual compressive stresses introduced by laser peening.

As shown for the titanium test piece, laser shock processing changed the frequency response condition frequency approximately 0.5 percent after each laser peening for a total of one percent frequency change. The aluminum test piece as shown in FIG. 6, changed approximately 1 percent after the first laser peening and about 2 percent after the second, for a total change of three percent in its vibratory frequency response. The best vibratory resonance condition frequency change was shown in the steel test piece having an approximately 2.8 percent change after the first laser peening followed by a 0.5 to 2 percent change after the second shocking, for a total of about four percent frequency change. Such frequency changes would be sufficient to enhance the operating envelope of workpieces, such as gas turbine engine airfoils, partially by laser shock peening larger areas and at higher intensities.

Figure 8:
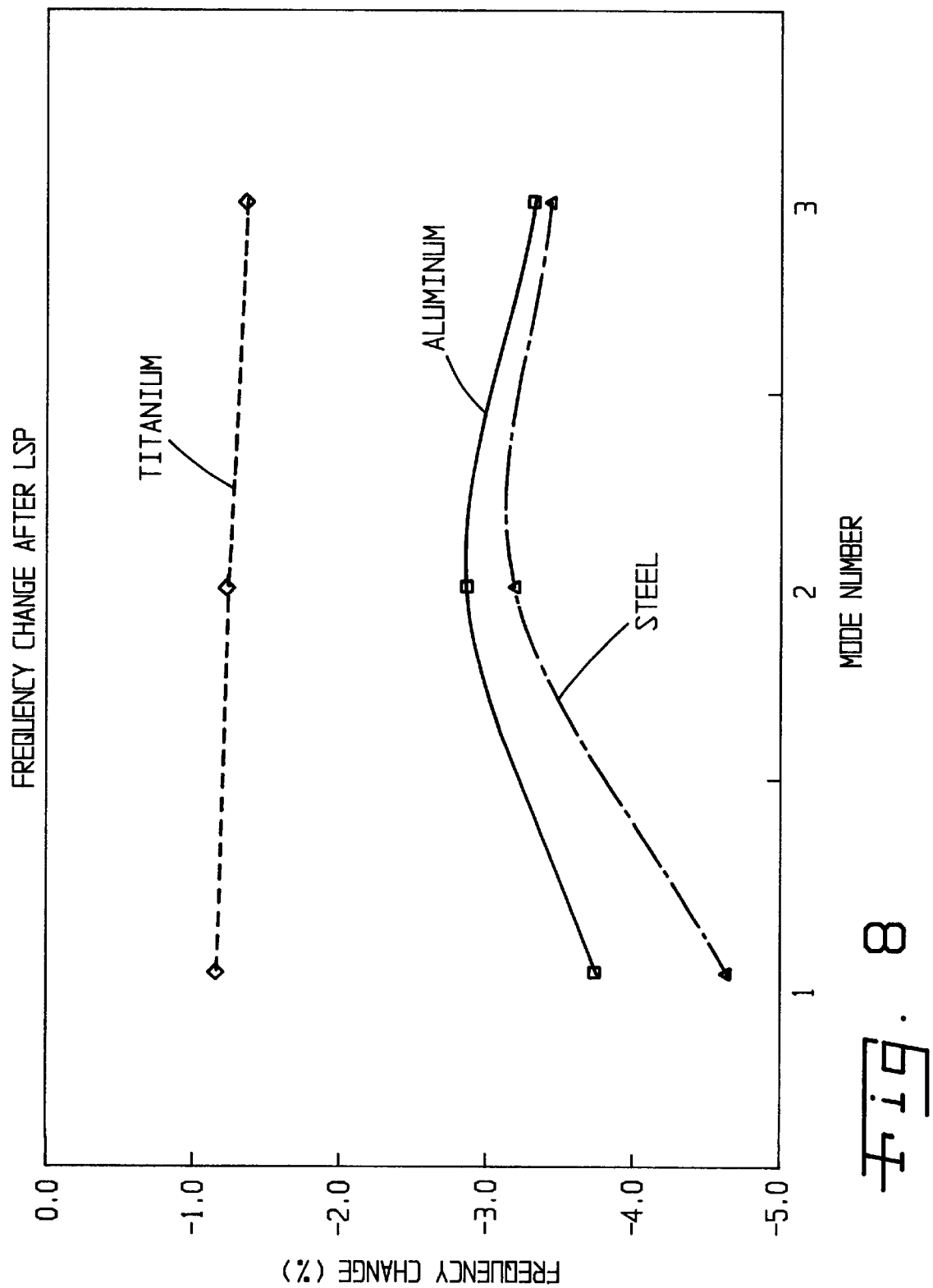
FIG. 8 is a graph showing the above three test pieces frequency change for the first three modes after laser shock peening.

FIG. 8 shows the comparison to frequency change between the titanium, aluminum, and steel test coupons for the first three modes only.

Experimental evidence for different-shaped workpieces needs to be determined for a particular area to be laser shock peened to counteract particular modes and vibration resonance condition frequencies. Models, particularly finite element modeling, can be developed and used to determine the appropriate areas and intensities of laser peening when the depths and magnitudes of the residual compressive stresses are known. With the present invention it is taught that residual compressive stressors do change the vibration frequencies of workpieces. Models can be developed to practice changes in the vibratory resonance condition of a particular mode. Particular areas to be laser shock peened on a particular part may be determined via experimentation, observation, and or modeling of these responses.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed:

1. A method for modifying the vibration resonance characteristics of a workpiece, the method comprising:

determining a vibratory resonance condition frequency of the workpiece;

determining the mode shape of said vibratory resonance condition;

determining the maximum curvature for the determined mode shape and vibratory resonance condition frequency;

locating an area on the workpiece that includes the maximum curvature for the determined mode shape and vibratory resonance condition; then laser shock peening the located area to create residual compressive stresses within the workpiece to shift the determined vibratory resonance condition frequency.

2. The method of claim 1 in which said area is on a predetermined nodal line.

3. The method of claim 1 further including the step of shot peening the workpiece.

4. The method of claim 1 in which said area is selected to cover the maximum high curvature region of more than one vibrational mode.

5. The method of claim 1 utilizing shot peening in place of laser shock peening.

6. The method of claim 1 in which said vibratory resonance condition is shifted to a predetermined desired vibratory resonance condition frequency.

7. A method of modifying the vibration resonance characteristic of a workpiece, the method comprising:

determining a vibratory resonance condition frequency of the workpiece;

determining the mode shape of the vibratory resonance condition;

determining the maximum curvature for the determined mode shape and vibratory resonance condition frequency;

locating an area on the workpiece that includes the maximum curvature for the determined mode shape and vibratory resonance condition; then inducing residual stresses to the located area to shift the determined vibratory resonance condition frequency.

8. The method of claim 7 wherein said area is substantially near said maximum high curvature region.

9. The method of claim 1 wherein said area is substantially near said maximum high curvature region.

* * * * *